(12) United States Patent
Pascal et al.

(10) Patent No.: US 12,189,722 B2
(45) Date of Patent: Jan. 7, 2025

(54) CONTENT BASED ON-DEVICE IMAGE ADJUSTMENT

(71) Applicant: International Business Machines Corporation, Armonk, NY (US)

(72) Inventors: Geoffrey Pascal, Mirabel aux baronnies (FR); Christophe Menichetti, Montpellier (FR); Nicolas Tallet, Montpellier (FR); Pascal Vezolle, Villeneuve les Maguelone (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 17/505,105

(22) Filed: Oct. 19, 2021

(65) Prior Publication Data

US 2023/0118072 A1     Apr. 20, 2023

(51) Int. Cl.
| | | |
|---|---|---|
| *G06F 18/2411* | (2023.01) | |
| *G06F 18/214* | (2023.01) | |
| *G06F 18/2431* | (2023.01) | |

(52) U.S. Cl.
CPC ........ *G06F 18/2411* (2023.01); *G06F 18/214* (2023.01); *G06F 18/2431* (2023.01)

(58) Field of Classification Search
CPC .............. G06F 18/2411; G06F 18/214; G06F 18/2431
USPC ........................................................ 382/224
See application file for complete search history.

(56) References Cited

U.S. PATENT DOCUMENTS

| | | | |
|---|---|---|---|
| 8,385,971 B2 | 2/2013 | Rhoads et al. | |
| 10,827,023 B1 | 11/2020 | Yan et al. | |
| 11,314,970 B1* | 4/2022 | Swaminathan | G06N 3/08 |
| 11,688,159 B2* | 6/2023 | Peng | G06F 9/4451 |
| | | | 707/730 |
| 11,854,264 B2* | 12/2023 | Marzorati | G06V 20/48 |
| 2008/0012935 A1 | 1/2008 | Echtenkamp | |
| 2009/0074271 A1 | 3/2009 | Nakamura et al. | |

(Continued)

FOREIGN PATENT DOCUMENTS

| | | |
|---|---|---|
| CN | 101389261 A | 3/2009 |
| CN | 107871117 A | 4/2018 |
| CN | 113393471 A | 9/2021 |

OTHER PUBLICATIONS

International Searching Authority, PCT/CN2022/124364, Dec. 30, 2022.

(Continued)

*Primary Examiner* — William D Titcomb
(74) *Attorney, Agent, or Firm* — Garg Law Firm, PLLC; Rakesh Garg; Matt Zehrer

(57) ABSTRACT

Using a trained image classification model, a first image captured using an image capture device is classified, the trained image classification model executing in the same system as the image capture device, the classifying producing an inappropriate content classification of the first image. Using a trained feature extraction model, a pattern within a portion of the first image is recognized from the first image, the trained feature extraction model executing in the same system as the image capture device, the pattern predefined as inappropriate content. Based on the classification and the pattern, the first image is adjusted.

19 Claims, 10 Drawing Sheets

(56) References Cited

U.S. PATENT DOCUMENTS

| | | | | |
|---|---|---|---|---|
| 2013/0283388 | A1* | 10/2013 | Ashok | G06F 21/60 726/26 |
| 2015/0070516 | A1 | 3/2015 | Shoemake et al. | |
| 2016/0063386 | A1* | 3/2016 | Xie | G06N 5/02 706/12 |
| 2016/0104040 | A1 | 4/2016 | Ragnet et al. | |
| 2016/0328923 | A1* | 11/2016 | Alewine | A63F 13/35 |
| 2017/0289624 | A1* | 10/2017 | Avila | G06V 20/49 |
| 2018/0032845 | A1* | 2/2018 | Polak | G06F 18/2411 |
| 2018/0089505 | A1 | 3/2018 | El-Khamy et al. | |
| 2018/0293908 | A1* | 10/2018 | Wang | G06V 30/333 |
| 2019/0156193 | A1* | 5/2019 | Jaroch | G06N 20/00 |
| 2020/0412744 | A1* | 12/2020 | Spurlock | G06F 18/214 |
| 2021/0105518 | A1* | 4/2021 | Kannan | H04N 21/251 |
| 2021/0329338 | A1* | 10/2021 | Khov | G06N 3/045 |
| 2021/0383394 | A1* | 12/2021 | Zarakas | G06Q 20/4015 |
| 2022/0094713 | A1* | 3/2022 | Lee | G06F 18/214 |
| 2022/0167051 | A1* | 5/2022 | Hall | H04N 21/458 |
| 2022/0405510 | A1* | 12/2022 | Marzorati | G06V 20/20 |

OTHER PUBLICATIONS

International Search Report and Written Opinion dated Dec. 30, 2022, for International Application No. PCT/CN2022/124304, filed Oct. 10, 2022.

Velasco, Facebook Wants Artificial Intelligence to Filter Live Videos and Take Down Offensive Content, May 26, 2018, https://www.techtimes.com/articles/228653/20180526/facebook-wants-artificial-intelligence-to-filter-live-videos-and-take-down-offensive-content.htm.

ip.com, Real Time Visuals Restrictions in Smart Devices, Oct. 27, 2020.

Yuan et al., Violation Detection of Live Video Based on Deep Learning, Hindawi, Scientific Programming, vol. 2020, May 11, 2020.

Liu et al., New classification models for detecting Hate and Violence web content, Aug. 1, 2016, 2015 7th International Joint Conference on Knowledge Discovery, Knowledge Engineering and Knowledge Management (IC3K), Nov. 12-14, 2015.

* cited by examiner

CONTENT BASED ON-DEVICE IMAGE ADJUSTMENT

BACKGROUND

The present invention relates generally to a method, system, and computer program product for image adjustment. More particularly, the present invention relates to a method, system, and computer program product for content based on-device image adjustment.

Most cameras used today, both still image and video, include one or more sensors that capture image data, an ability to save the captured data into temporary or permanent storage, an ability to transmit the captured data, in real time, to another device or application via a network such as the Internet, and a processor executing code implementing these operations. Recording and transmitting captured video data to another device in real time is also referred to as livestreaming.

SUMMARY

The illustrative embodiments provide a method, system, and computer program product. An embodiment includes a method that classifies, using a trained image classification model, a first image captured using an image capture device, the trained image classification model executing in the same system as the image capture device, the classifying producing an inappropriate content classification of the first image. An embodiment recognizes, from the first image using a trained feature extraction model, a pattern within a portion of the first image, the trained feature extraction model executing in the same system as the image capture device, the pattern predefined as inappropriate content. An embodiment adjusts, based on the classification and the pattern, the first image.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
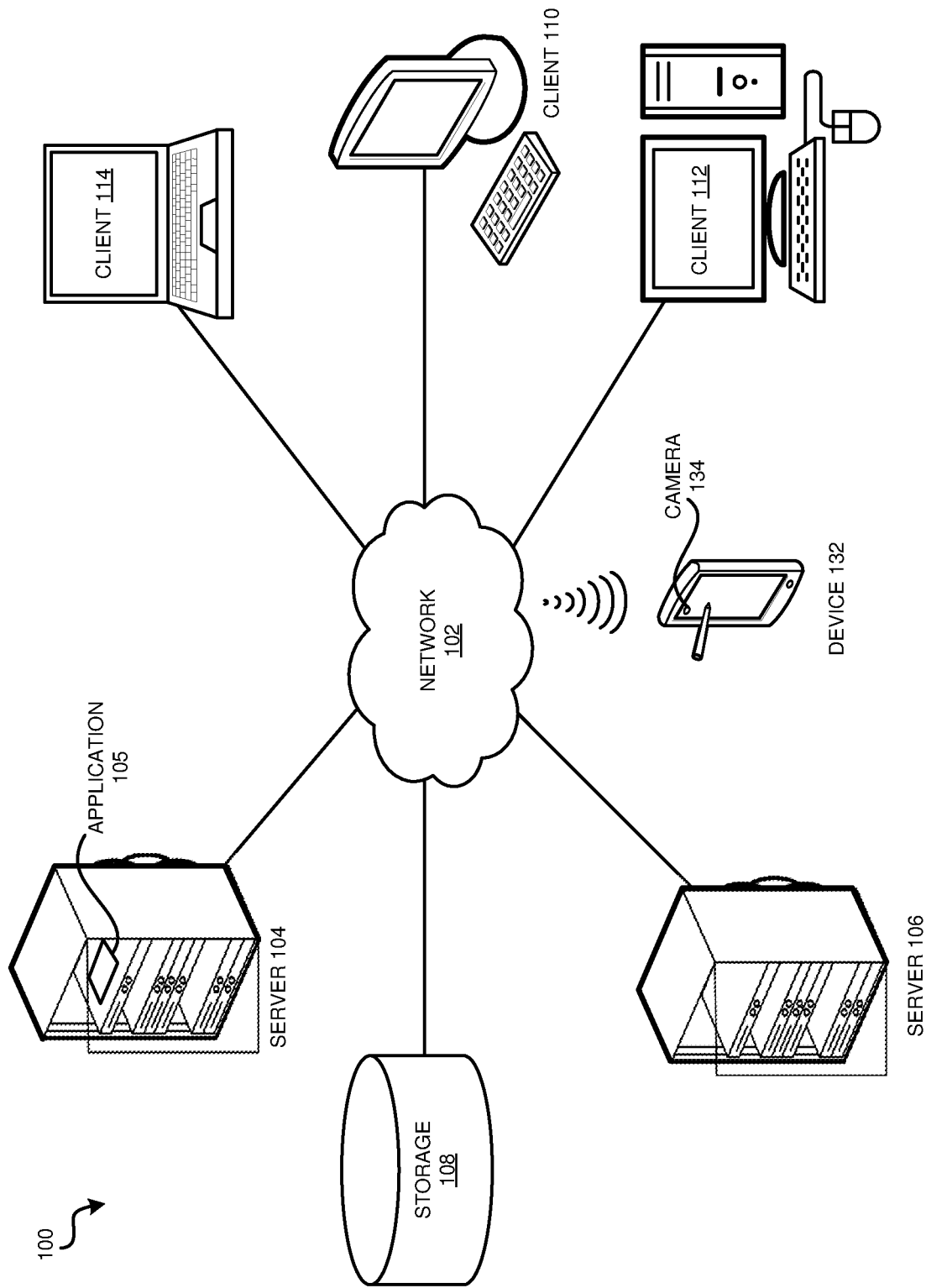
FIG. 1 depicts a block diagram of a network of data processing systems in which illustrative embodiments may be implemented.

The illustrative embodiments recognize that, as sharing still images and video becomes more popular, so does the probability that inappropriate content will be shared by transmission to another device or application. Inappropriate content includes any content that a device administrator or user has determined should not be transmitted off of an image capture device. Inappropriate content might be deemed inappropriate for privacy, security, or other reasons, and might be considered inappropriate in some circumstances but not in others. For example, on an employer-administered device issued to an employee for use in the employee's job, a still image or video of an employee identification badge or a document marked "confidential" might be considered inappropriate. As another example, on a child's device administered by the child's parents, a still image or video of a person might be considered inappropriate, but a photo or video of an animal might not be considered inappropriate. As a third example, a photo of an individual's government-issued identification card might be appropriate content when stored on the image capture device itself (e.g., as an backup to one's personal records), but might not be appropriate content to post to a publicly-available portion of a social media application (where it could be used, e.g., in identify theft). In addition, a device user may not realize that content being shared should not be. For example, an employee user might be unaware that sharing certain content violates an organization's security and device use policy.

The illustrative embodiments also recognize that, while some off-device content repositories, such as social media applications, include their own content controls, those content controls may not match those desired by a device user or administrator. As well, network latency or bandwidth limitations might render off-device content controls ineffective for use in real time. In addition, once content is transmitted off an image capture device, or exposed to an untrusted portion of an application executing on a device, a device user or administrator loses the ability to control usage of that content.

Thus, the illustrative embodiments recognize that there is an unmet need to prevent inappropriate content from being transmitted away from an image capture device. In addition, because livestreaming is popular, there is an unmet need to prevent transmission of inappropriate content in real time.

The illustrative embodiments recognize that the presently available tools or solutions do not address these needs or provide adequate solutions for these needs. The illustrative embodiments used to describe the invention generally address and solve the above-described problems and other problems related to content based on-device image adjustment.

An embodiment can be implemented as a software application. The application implementing an embodiment can be configured as a modification of an existing image capture and transmission system, as a separate application that operates in conjunction with an existing image capture and transmission system, a standalone application, or some combination thereof.

Particularly, some illustrative embodiments provide a method that classifies, using a trained image classification model, a first image captured using an image capture device, recognizes, from the first image using a trained feature extraction model, a pattern within a portion of the first image, and adjusts, based on the classification and the pattern, the image.

An embodiment executes on a processor within an image capture device, such as a still or video camera. An embodiment receives data, either a still image or video frames, from the image capture device in real time.

An embodiment uses a trained image classification model to classify an input image, either a still image or a video frame. One embodiment classifies an input image as including inappropriate content or not including inappropriate content. Another embodiment classifies an input image as to the amount of inappropriate content the image includes. Another embodiment classifies an input image as to a type of inappropriate content the image includes. Another embodiment classifies an input image as to the amount of each type of inappropriate content the image includes. Another embodiment both classifies an input image and produces a confidence score, indicating a level of confidence in the classification, such as a percentage value or a number in a 0-1 scale. For example, an embodiment might classify an input image as including inappropriate content with a 75% confidence. Techniques for performing image classification are presently available.

The image classification model is trained to classify input images using a set of training images, labelled as to whether or not they include content defined as inappropriate in a particular configuration of the embodiment, or one or more particular types of inappropriate content. For example, if an embodiment is configured to treat any image including text, or more than a specified percentage of text, as inappropriate (to prevent sharing of images of confidential documents from an employer-owned device), the set of training images might include appropriately labelled images including text and images not including text, or not including more than a specified percentage of text. As another example, if an embodiment is configured to treat any image including depictions of alcohol or drinking as inappropriate (e.g., for a child's device), the set of training images might include appropriately labelled images including particular shapes of bottles, particular labels of bottles or cans, and particular shapes of glasses often used for alcoholic drinks, as well as images without those elements. As a third example, if an embodiment is configured to treat any image including a human face as inappropriate (e.g., for privacy reasons), the set of training images might include appropriately labelled images including images of human faces in various settings, as well as images without those elements.

An embodiment uses a trained feature extraction model to recognize a pattern within an input image, either a still image or a video frame. To recognize a pattern, an embodiment analyzes an image to determine a set of features of a portion of an image and compares the set of features to a set of features of known patterns. Techniques for performing feature extraction and pattern recognition are presently available. Some non-limiting examples of patterns that an embodiment might recognize are those of text, particular shapes of bottles, particular labels of bottles or cans, particular shapes of glasses often used for alcoholic drinks, and human faces. One embodiment identifies a portion of the image as including a pattern or object predefined to be inappropriate content, without further identifying the type of inappropriate content. Another embodiment identifies a portion of the image as including a particular type of inappropriate content, e.g. a face or content associated with alcohol. One embodiment identifies the portion using a set of coordinates and a size of the portion. Another embodiment identifies coordinates of points along a boundary of the portion. Another embodiment both identifies an image portion as including inappropriate content and produces a confidence score, indicating a level of confidence in the identification, such as a percentage value or a number in a 0-1 scale. For example, an embodiment might recognize inappropriate content within a portion of an image with a 75% confidence. The feature extraction model is trained to recognize a pattern within an image using a presently available training technique.

An embodiment adjusts an image to remove inappropriate content based on outputs of the image classification model, the feature extraction model, or both.

In one embodiment, the image classification model and feature extraction model are arranged in parallel, and the embodiment adjusts an image to remove inappropriate content based on a combination of the two model outputs. In an embodiment that computes confidence scores for model outputs, the embodiment computes a combined confidence score by multiplying confidence scores of each model output together. For example, if one model computes a 90% confidence that an image contains inappropriate content, and another model computes an 80% confidence that the image contains inappropriate content. In another embodiment that computes confidence scores for model outputs, the embodiment combines model outputs by selecting the model output with the higher confidence score.

In another embodiment, the image classification model and feature extraction model are arranged in series, with the image classification model processing an input image first. If the image classification model classifies an input image as including inappropriate content, classifies an input image as including more than a threshold amount of inappropriate content, classifies an input image as including a type of inappropriate content or more than a threshold amount of a type of inappropriate content, or performs any classification result with a confidence score higher than a threshold confidence score, an embodiment omits execution of the feature extraction model and adjusts the image based on the output of the image classification model. Because image classification is typically faster than feature extraction using presently available techniques and processors, omitting execution of the feature extraction model when an image has already been determined to include sufficient inappropriate content is faster than executing both models in series, which is important in processing input images in real time.

In another embodiment, the image classification model and feature extraction model are arranged in series, with the feature extraction model processing an input image first. If the feature extraction model classifies a portion of an input image as including inappropriate content or one or more types of inappropriate content, or if the portion including inappropriate content has more than a threshold percentage of the total area of the image, or performs any classification result with a confidence score higher than a threshold confidence score, an embodiment omits execution of the image classification model and adjusts the image based on the output of the feature extraction model.

Another embodiment includes a trained image classification model and not a trained feature extraction model, and adjusts an image to remove inappropriate content based on the output of the image classification model. Another embodiment includes a trained feature extraction model and not a trained image classification model, and adjusts an image to remove inappropriate content based on the output of the feature extraction model.

The image classification and feature extraction models need not be trained on the device on which the trained models execute. Instead, the image classification and feature extraction models can be trained according to one or more predefined categories of inappropriate content on another system, then executed on a processor within an image capture device. In addition, different, or additional, predefined categories of inappropriate content can be analyzed for by implementing models trained for those categories.

One embodiment adjusts an image to remove inappropriate content by preventing the entire image from being transmitted off the device on which the embodiment is executing. Another embodiment adjusts an image to remove inappropriate content by blurring the entire image so that details of the image are not visible or reconstructable, replacing the entire image with a different image (e.g. a black or white block, or a text indication that the image was blocked), or another presently known technique. Another embodiment adjusts an image to remove inappropriate content by blurring a portion of the image so that details of the image are not visible or reconstructable, replacing the portion with a different image (e.g. a black or white block, or a text indication that the portion was blocked), or another presently known technique. An embodiment uses output from the feature extraction model, such as portion coordinates and size, or a set of coordinates defining a portion boundary, to determine the image portion to adjust.

An embodiment includes a bypass mechanism. When the bypass mechanism is enabled, the embodiment does not analyze an input image for possible inappropriate content. In embodiments, the bypass mechanism is user- or administrator-configurable, via a command from the device on which the embodiment executes or another device.

Once an embodiment has adjusted an image, or determined that image adjustment is unnecessary, the embodiment communicates the image to another application executing on the same device as the embodiment, a software component of an application executing on the same device that is less trusted than the embodiment, or to another application executing on a different system from the embodiment. Implementing image adjustment on the image capture device, within a trusted software component such as a device driver for the image capture device, allows a device user or administrator to maintain the ability to control usage of that content.

The manner of content based on-device image adjustment described herein is unavailable in the presently available methods in the technological field of endeavor pertaining to image capture devices. A method of an embodiment described herein, when implemented to execute on a device or data processing system, comprises substantial advancement of the functionality of that device or data processing system in classifying, using a trained image classification model, a first image captured using an image capture device, recognizing, from the first image using a trained feature extraction model, a pattern within a portion of the first image, and adjusting, based on the classification and the pattern, the image.

The illustrative embodiments are described with respect to certain types of image contents and inappropriate contents, image analysis models, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
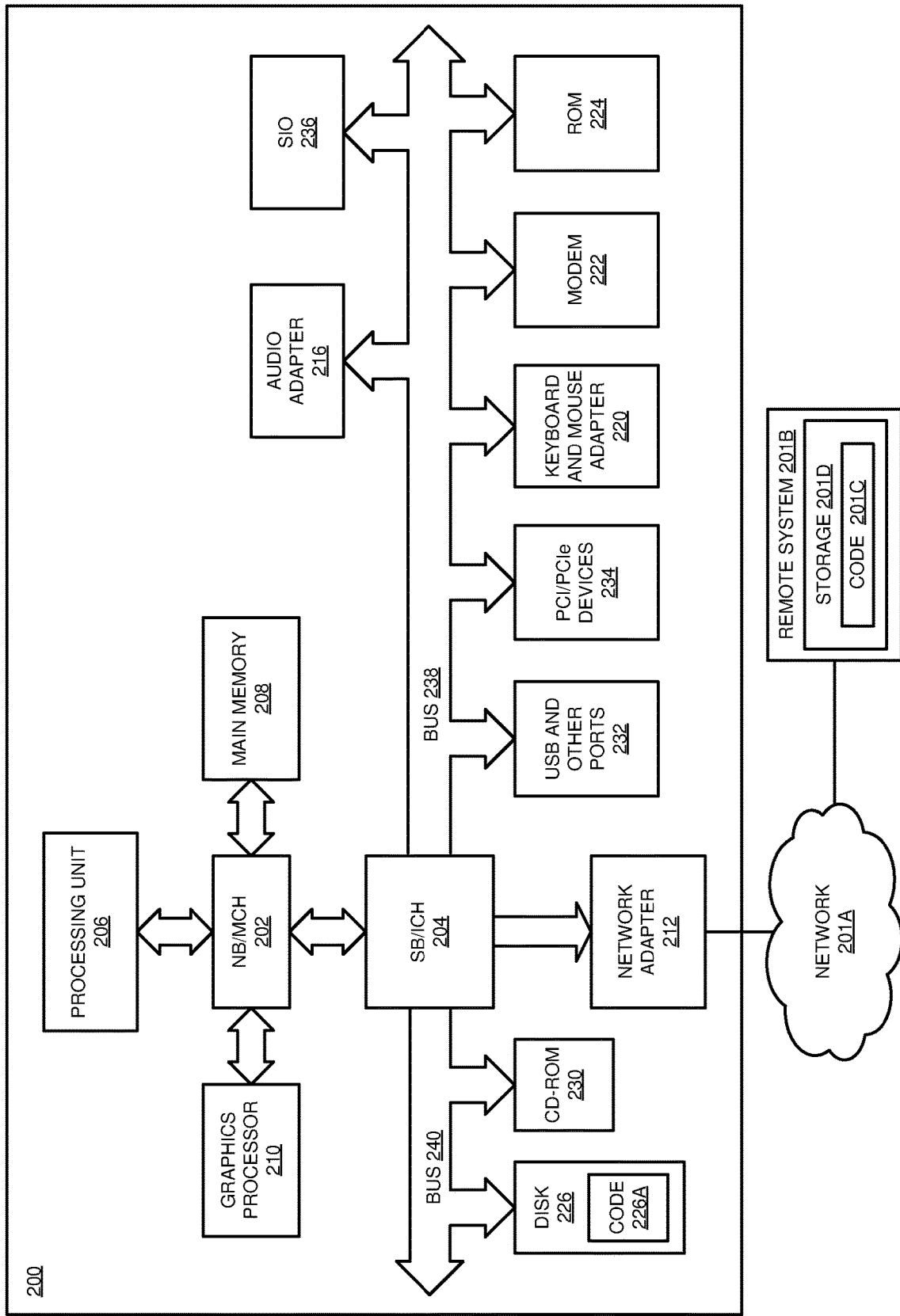
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes camera 134, which can be used to capture still images or video for analysis by an embodiment.

Application 105 implements an embodiment described herein. Application 105 executes in any of servers 104 and 106, clients 110, 112, and 114, and device 132. For example, when application 105 executes in device 132, application 105 analyzes images from camera 134 in real time and provides adjusted images to another application executing in device 132, or another application executing in servers 104 and 106 or clients 110, 112, and 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
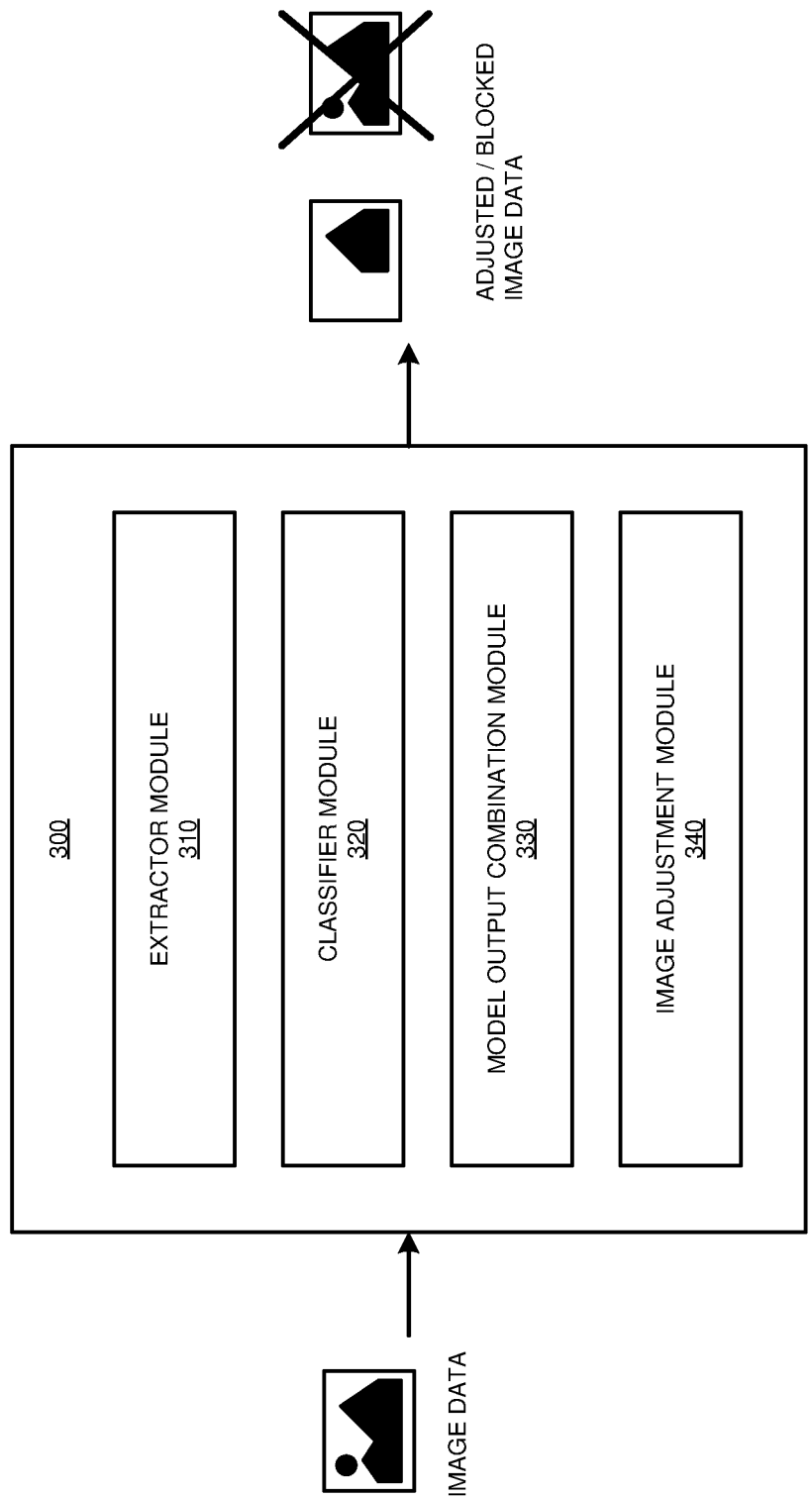
FIG. 3 depicts a block diagram of an example configuration for content based on-device image adjustment in accordance with an illustrative embodiment.

With reference to FIG. 3, this figure depicts a block diagram of an example configuration for content based on-device image adjustment in accordance with an illustrative embodiment. Application 300 is an example of application 105 in FIG. 1 and executes in any of servers 104 and 106, clients 110, 112, and 114, and device 132 in FIG. 1.

Application 300 executes on a processor within an image capture device, such as camera 134 in device 132 in FIG. 1. Application 300 receives data, either a still image or video frames, from the image capture device in real time.

Classifier module 320 uses a trained image classification model to classify an input image, either a still image or a video frame. One implementation of module 320 classifies an input image as including inappropriate content or not including inappropriate content. Another implementation of module 320 classifies an input image as to the amount of inappropriate content the image includes. Another implementation of module 320 classifies an input image as to a type of inappropriate content the image includes. Another implementation of module 320 classifies an input image as to the amount of each type of inappropriate content the image includes. Another implementation of module 320 both classifies an input image and produces a confidence score, indicating a level of confidence in the classification, such as a percentage value or a number in a 0-1 scale. The image classification model is trained to classify input images using a set of training images, labelled as to whether or not they include content defined as inappropriate in a particular configuration of the embodiment, or one or more particular types of inappropriate content.

Extractor module 310 uses a trained feature extraction model to recognize a pattern within an input image, either a still image or a video frame. To recognize a pattern, module 310 analyzes an image to determine a set of features of a portion of an image and compares the set of features to a set of features of known patterns. One implementation of module 310 identifies a portion of the image as including a pattern or object predefined to be inappropriate content, without further identifying the type of inappropriate content. Another implementation of module 310 identifies a portion of the image as including a particular type of inappropriate content. One implementation of module 310 identifies the portion using a set of coordinates and a size of the portion. Another implementation of module 310 identifies coordinates of points along a boundary of the portion. Another implementation of module 310 both identifies an image portion as including inappropriate content and produces a confidence score, indicating a level of confidence in the identification, such as a percentage value or a number in a 0-1 scale.

Image adjustment module 340 adjusts an image to remove inappropriate content based on outputs of the image classification model, the feature extraction model, or both.

In one implementation of application 300, modules 310 and 320 are arranged in parallel. Model output combination module 330 combines the outputs of modules 310 and 320, and module 340 adjusts an image to remove inappropriate content based on the combination. In an implementation of application 300 that computes confidence scores for model outputs, module 340 computes a combined confidence score by multiplying confidence scores of each model output together.

In another implementation of application 300, modules 310 and 320 are arranged in series, with module 320 processing an input image first. If module 320 classifies an input image as including inappropriate content, classifies an input image as including more than a threshold amount of inappropriate content, classifies an input image as including a type of inappropriate content or more than a threshold amount of a type of inappropriate content, or performs any classification result with a confidence score higher than a threshold confidence score, application 300 omits execution of module 310 and module 340 adjusts the image based on the output of module 320.

In another implementation of application 300, modules 310 and 320 are arranged in series, with module 310 processing an input image first. If module 310 classifies a portion of an input image as including inappropriate content or one or more types of inappropriate content, or if the portion including inappropriate content has more than a threshold percentage of the total area of the image, or performs any classification result with a confidence score higher than a threshold confidence score, application 300 omits execution of the image classification model and module 340 adjusts the image based on the output of the module 310.

Another implementation of application 300 includes module 320 and not module 310, and module 340 adjusts an image to remove inappropriate content based on the output of module 320. Another implementation of application 300 includes module 310 and not module 320, and module 340 adjusts an image to remove inappropriate content based on the output of module 310.

One implementation of module 340 adjusts an image to remove inappropriate content by preventing the entire image from being transmitted off the device on which application 300 is executing. Another implementation of module 340 adjusts an image to remove inappropriate content by blurring the entire image so that details of the image are not visible or reconstructable, replacing the entire image with a different image, or another presently known technique. Another implementation of module 340 adjusts an image to remove inappropriate content by blurring a portion of the image so that details of the image are not visible or reconstructable, replacing the portion with a different image, or another presently known technique. Module 340 uses output from module 310, such as portion coordinates and size, or a set of coordinates defining a portion boundary, to determine the image portion to adjust.

Application 300 includes a bypass mechanism. When the bypass mechanism is enabled, application 300 does not analyze an input image for possible inappropriate content. In implementations of application 300, the bypass mechanism is user- or administrator-configurable, via a command from the device on which application 300 executes or another device.

Once application 300 has adjusted an image, or determined that image adjustment is unnecessary, application 300 communicates the image to another application executing on the same device as application 300, a software component of an application executing on the same device that is less trusted than application 300, or to another application executing on a different system from application 300.

Figure 4:
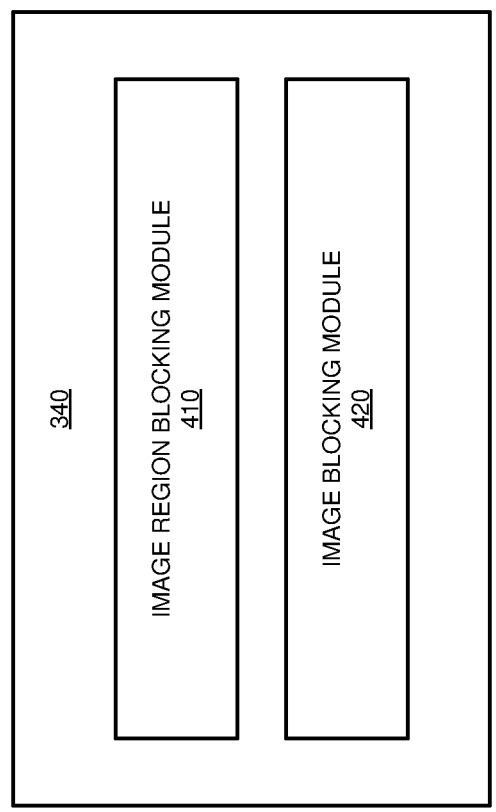
FIG. 4 depicts a block diagram of an example configuration for content based on-device image adjustment in accordance with an illustrative embodiment.

With reference to FIG. 4, this figure depicts a block diagram of an example configuration for content based on-device image adjustment in accordance with an illustrative embodiment. In particular, FIG. 4 depicts more detail of module 340 in FIG. 3.

One implementation of image blocking module 420 adjusts an image to remove inappropriate content by preventing the entire image from being transmitted off the device on which application 300 is executing. Another implementation of module 420 adjusts an image to remove inappropriate content by blurring the entire image so that details of the image are not visible or reconstructable, replacing the entire image with a different image, or another presently known technique. Implementations of image region block module 410 adjust an image to remove inappropriate content by blurring a portion of the image so that details of the image are not visible or reconstructable, replacing the portion with a different image, or another presently known technique.

Figure 5:
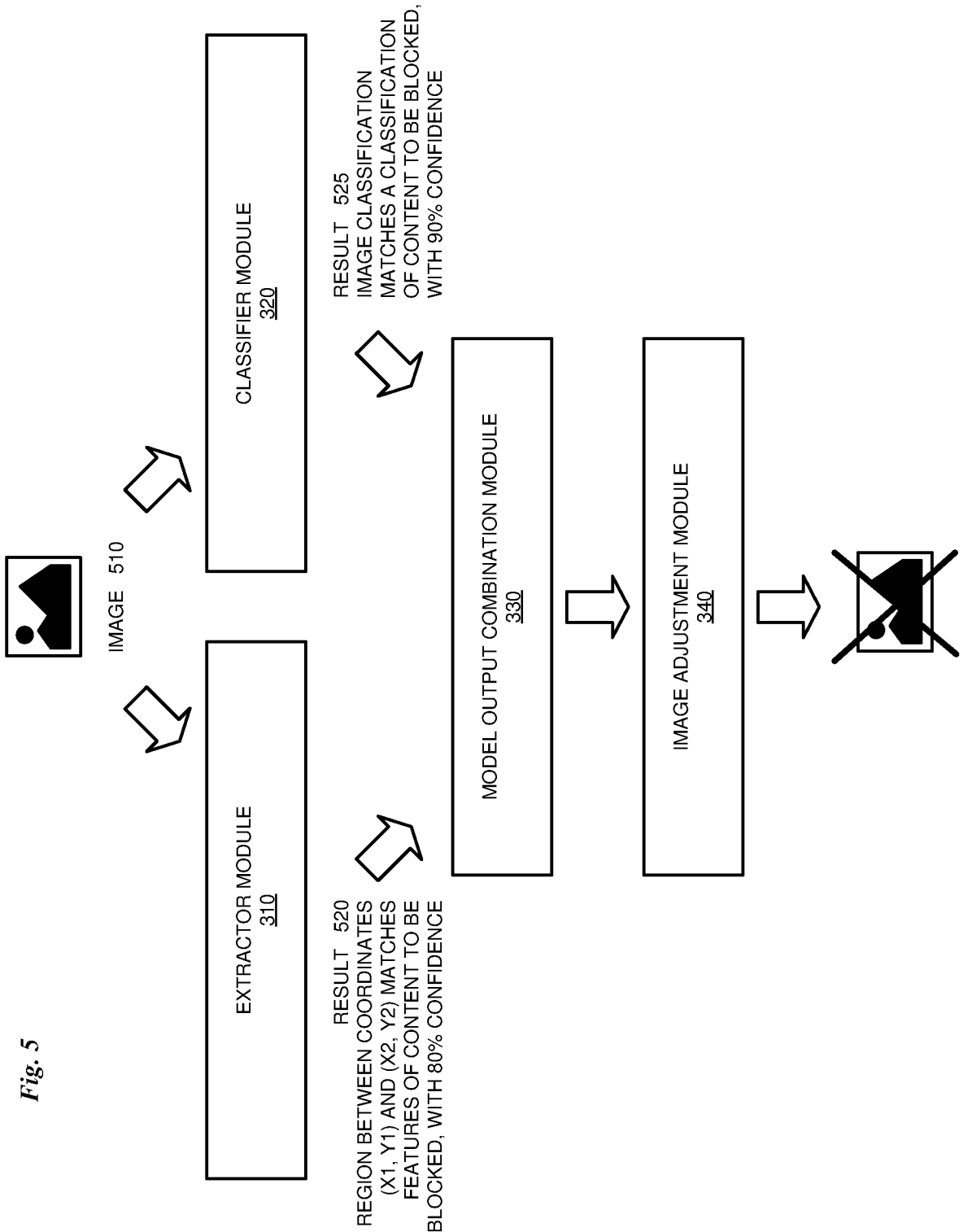
FIG. 5 depicts an example of content based on-device image adjustment in accordance with an illustrative embodiment.

With reference to FIG. 5, this figure depicts an example of content based on-device image adjustment in accordance with an illustrative embodiment. The example can be executed using application 300 in FIG. 3. Extractor module 310, classifier module 320, model output combination module 330, and image adjustment module 340 are the same as extractor module 310, classifier module 320, model output combination module 330, and image adjustment module 340 in FIG. 3.

As depicted, extractor module 310 and classifier module 320 are arranged in parallel. Module 310 analyzes image 510, producing result 520. Module 320 also analyzes image 510, producing result 525. Model output combination module 330 combines the outputs of modules 310 and 320, producing result 530. Based on result 530, image adjustment module 340 blocks image 510 from being transmitted off the device on which application 300 is executing. Note that the images depicted in FIGS. 5 and 6 are intended only as symbolic representations of images processed by application 300, and are not intended to depict any particular inappropriate content or adjustment removing inappropriate content.

Figure 6:
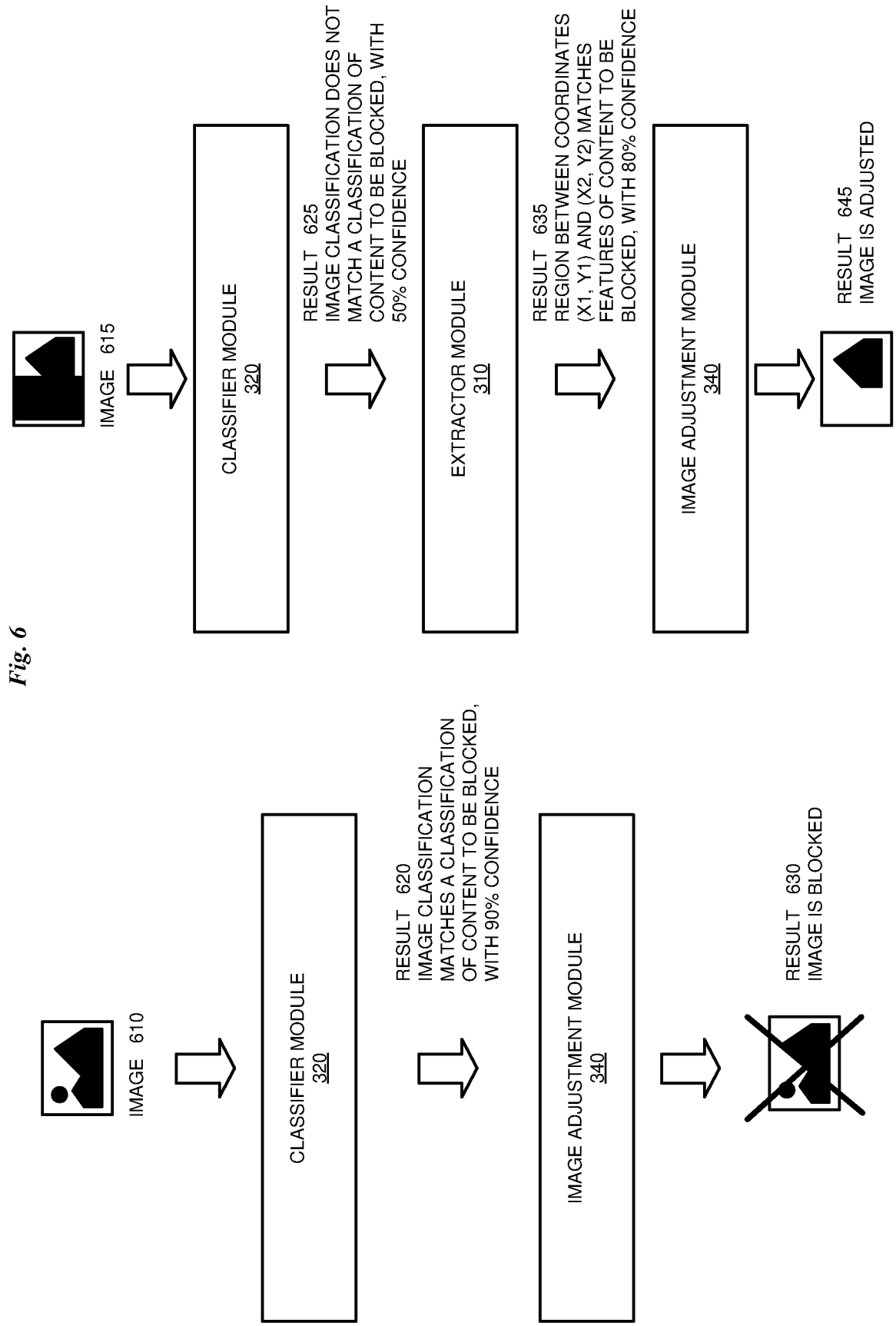
FIG. 6 depicts examples of content based on-device image adjustment in accordance with an illustrative embodiment.

With reference to FIG. 6, this figure depicts examples of content based on-device image adjustment in accordance with an illustrative embodiment. The examples can be executed using application 300 in FIG. 3. Extractor module 310, classifier module 320, and image adjustment module 340 are the same as extractor module 310, classifier module 320, and image adjustment module 340 in FIG. 3.

As depicted, extractor module 310 and classifier module 320 are arranged in series, with module 320 processing an input image first. In particular, module 320 analyzes image 610, producing result 620. Because module 320 has classified input image 610 image as including inappropriate content, with a confidence level above a threshold confidence level, module 310 is bypassed, and image adjustment module 340 produces result 630, in which image 610 is blocked from transmission off the device on which application 300 is executing.

As another example, module 320 analyzes image 615, producing result 625. Because module 320 has not classified input image 615 image as including inappropriate content, with a confidence level above a threshold confidence level, extractor module 310 also analyzes image 615, producing result 635. Based on result 635, image adjustment module 340 produces result 645, in which input image 615 is adjusted to remove an image region containing inappropriate content.

Figure 7:
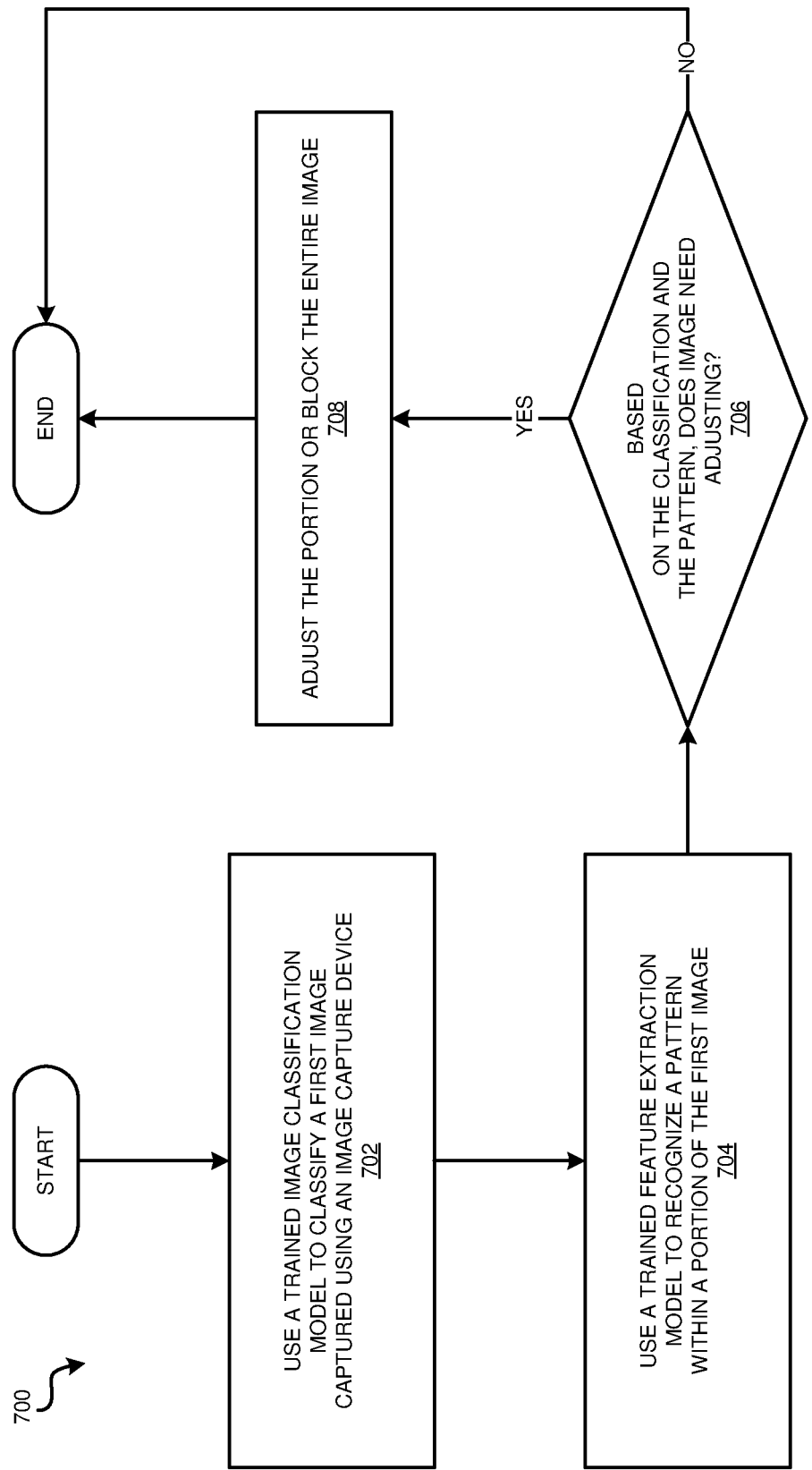
FIG. 7 depicts a flowchart of an example process for content based on-device image adjustment in accordance with an illustrative embodiment.

With reference to FIG. 7, this figure depicts a flowchart of an example process for content based on-device image adjustment in accordance with an illustrative embodiment. Process 700 can be implemented in application 300 in FIG. 3.

In block 702, the application uses a trained image classification model to classify a first image captured using an image capture device. In block 704, the application uses a trained feature extraction model to recognize a pattern within a portion of the first image. In block 706, the application determines, based on the classification and the pattern, whether the image needs adjusting. If so ("YES"

path of block 708), in block 708, the application adjusts the portion or blocks the entire image. In either case, the application then ends.

Figure 8:
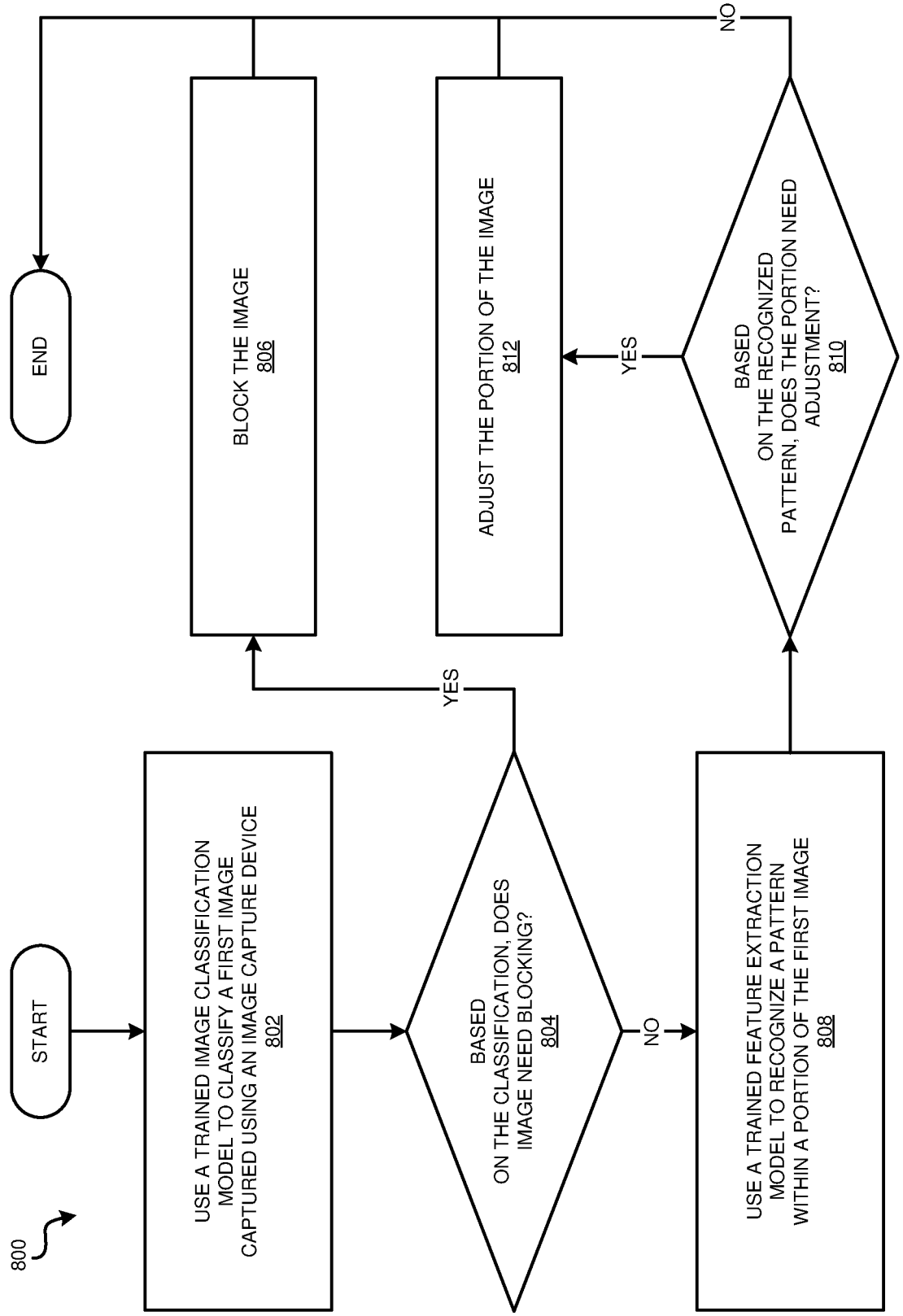
FIG. 8 depicts a flowchart of an example process for content based on-device image adjustment in accordance with an illustrative embodiment.

With reference to FIG. 8, this figure depicts a flowchart of an example process for content based on-device image adjustment in accordance with an illustrative embodiment. Process 800 can be implemented in application 300 in FIG. 3.

In block 802, the application uses a trained image classification model to classify a first image captured using an image capture device. In block 804, the application, determines, based on the classification, whether the image needs blocking. If so ("YES" path of block 804), in block 806 the application blocks the image, then ends. Otherwise ("NO" path of block 804), in block 808 the application uses a trained feature extraction model to recognize a pattern within a portion of the first image. In block 810, the application determines, based on the recognized pattern, whether the portion needs adjustment. If so ("YES" path of block 810), in block 812 the application adjusts the portion of the image. In either case, the application then ends.

Figure 9:
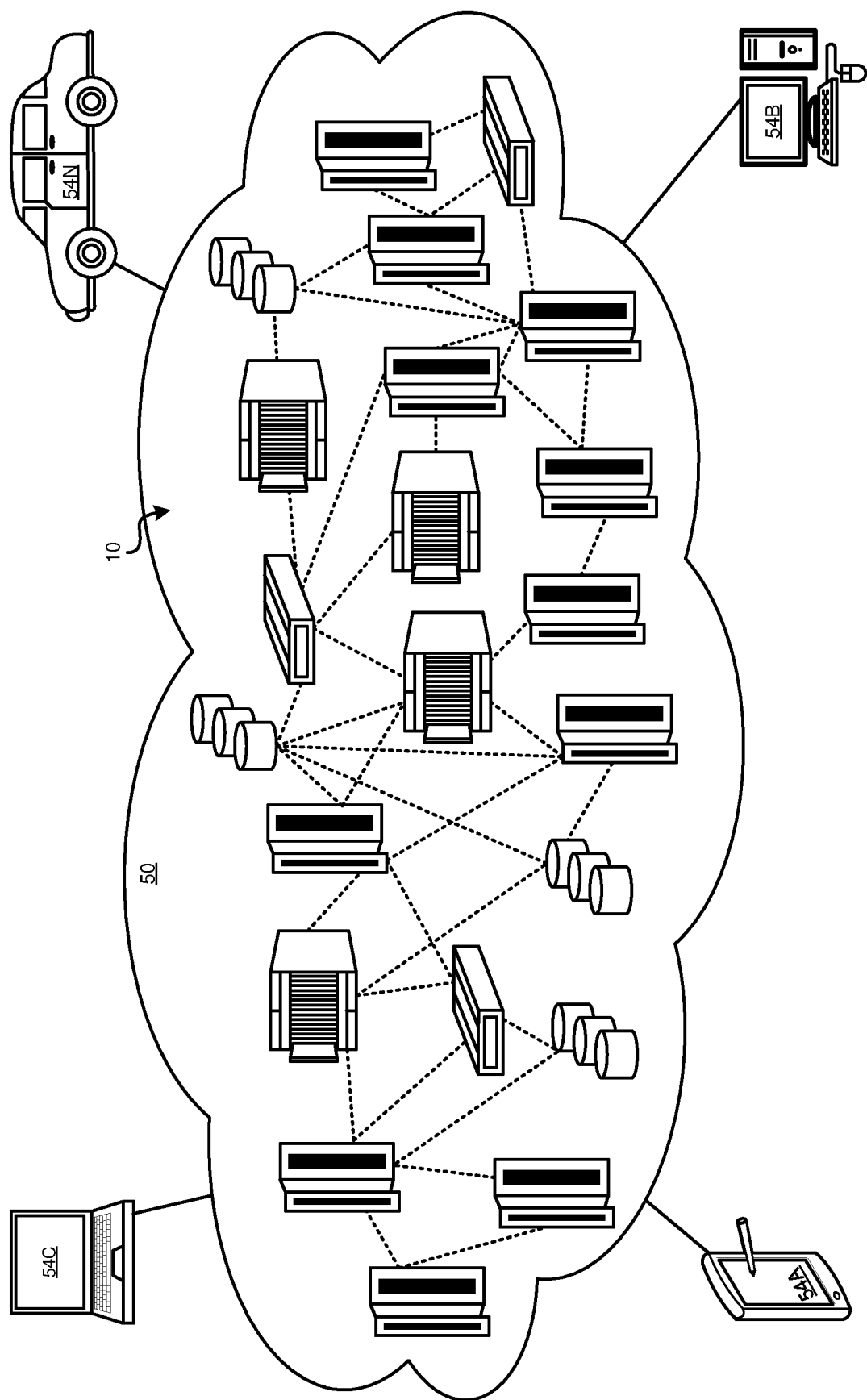
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
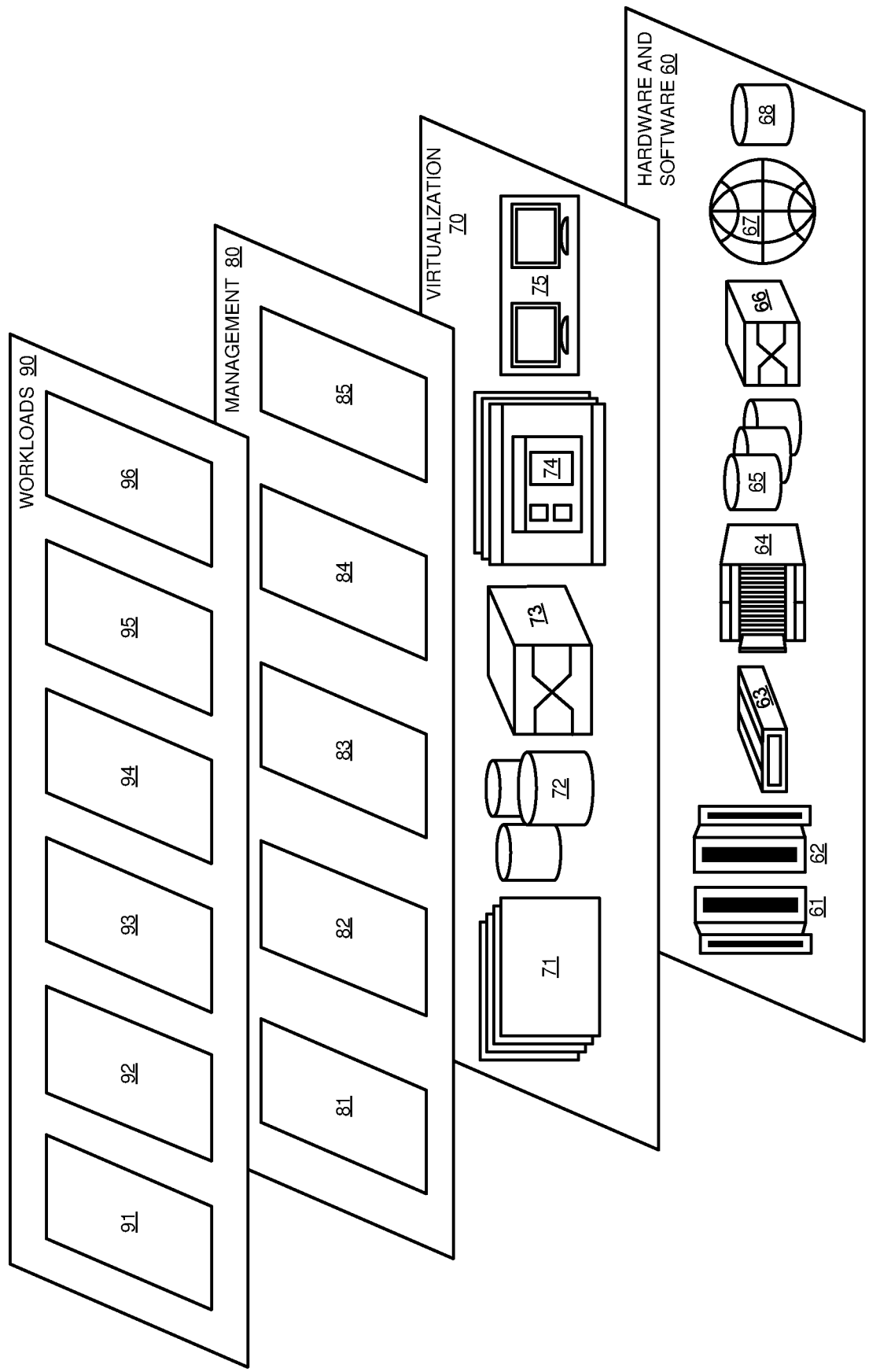
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for content based on-device image adjustment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
classifying, using a trained image classification model, a first image captured using an image capture device, the trained image classification model executing in a same system as the image capture device, the classifying producing an inappropriate content classification of the first image;
recognizing, from the first image using a trained feature extraction model, a pattern within a portion of the first image, the trained feature extraction model executing in the same system as the image capture device, the pattern predefined as inappropriate content;
adjusting, based on the pattern and a classification resulting from the classifying, the portion of the first image, wherein the adjusting leaves a remainder of the first image outside the portion unchanged; and
communicating, based on the adjusting the portion of the first image, the first image from the first user device to an application executing on a second user device used by an administrator to confirm that the first image matches a desire of the administrator.

2. The computer-implemented method of claim 1, wherein the classifying and the recognizing are performed concurrently.

3. The computer-implemented method of claim 1, further comprising:
classifying, using the trained image classification model, a second image captured using the image capture device, the classifying producing an inappropriate content classification of the second image; and
adjusting, based on the classification of the second image, the second image.

4. The computer-implemented method of claim 1, wherein the classifying further produces a classification confidence score corresponding to the inappropriate content classification of the first image.

5. The computer-implemented method of claim 4, wherein the adjusting is performed responsive to determining that the classification confidence score is above a first confidence threshold.

6. The computer-implemented method of claim 1, wherein the recognizing further produces a recognition confidence score corresponding to recognition of the pattern.

7. The computer-implemented method of claim 6, wherein the adjusting is performed responsive to determining that the recognition confidence score is above a second confidence threshold.

8. The computer-implemented method of claim 1, wherein the adjusting is performed responsive to determining that a combined confidence score is above a third confidence threshold, the combined confidence score comprising a product of a classification confidence score corresponding to the inappropriate content classification of the first image and a recognition confidence score corresponding to recognition of the pattern.

9. A computer program product for content based on-device image adjustment, the computer program product comprising:
one or more computer readable storage media, and program instructions collectively stored on the one or more computer readable storage media, the stored program instructions comprising:
program instructions to classify, using a trained image classification model, a first image captured using a first image capture device, the trained image classification model executing in a same system as the first image capture device, the program instruction to classify producing an inappropriate content classification of the first image;
program instructions to recognize, from the first image using a trained feature extraction model, a pattern within a portion of the first image, the trained feature extraction model executing in the same system as the first image capture device, the pattern predefined as inappropriate content;
program instructions to adjust, based on the pattern and a classification resulting from the program instructions to classify, the portion of the first image, wherein the adjusting leaves a remainder of the first image outside the portion unchanged; and
program instructions to communicate, based on the adjusting the portion of the first image, the first image from the first image capture device to an application executing on a second image capture device used by an administrator to confirm that the first image matches a desire of the administrator.

10. The computer program product of claim 9, wherein the program instructions to classify and the program instructions to recognize are performed concurrently.

11. The computer program product of claim 9, the stored program instructions further comprising:
program instructions to classify, using the trained image classification model, a second image captured using the image capture device, the classifying producing an inappropriate content classification of the second image; and
program instructions to adjust, based on the classification of the second image, the second image.

12. The computer program product of claim 9, wherein the classifying further produces a classification confidence score corresponding to the inappropriate content classification of the first image.

13. The computer program product of claim 12, wherein the adjusting is performed responsive to determining that the classification confidence score is above a first confidence threshold.

14. The computer program product of claim 9, wherein the recognizing further produces a recognition confidence score corresponding to recognition of the pattern.

15. The computer program product of claim 14, wherein the adjusting is performed responsive to determining that the recognition confidence score is above a second confidence threshold.

16. The computer program product of claim 9, wherein the adjusting is performed responsive to determining that a combined confidence score is above a third confidence threshold, the combined confidence score comprising a product of a classification confidence score corresponding to the inappropriate content classification of the first image and a recognition confidence score corresponding to recognition of the pattern.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to classify, using a trained image classification model, a first image captured using a first image capture device, the trained image classification model executing in a same system as the first image capture device, the program instructions to classify producing an inappropriate content classification of the first image;
program instructions to recognize, from the first image using a trained feature extraction model, a pattern within a portion of the first image, the trained feature extraction model executing in the same system as the first image capture device, the pattern predefined as inappropriate content;

program instructions to adjust, based on the pattern and a classification resulting from the program instructions to classify, the portion of the first image, wherein the adjusting leaves a remainder of the first image outside the portion unchanged; and program instructions to communicate, based on the adjusting the portion of the first image, the first image from the first image capture device to an application executing on a second image capture device used by an administrator to confirm that the first image matches a desire of the administrator.

\* \* \* \* \*